Aug. 22, 1967  R. F. SHANNON ET AL  3,337,669
APPARATUS AND METHODS FOR PRODUCING
PANELS OF MINERAL FIBERS
Filed June 12, 1964
2 Sheets-Sheet 1

RICHARD F. SHANNON,
FLORIAN T. GORSKI &
WADE V. ZELLAR
INVENTORS

BY
ATTORNEYS

Aug. 22, 1967  R. F. SHANNON ET AL  3,337,669
APPARATUS AND METHODS FOR PRODUCING
PANELS OF MINERAL FIBERS
Filed June 12, 1964  2 Sheets-Sheet 2
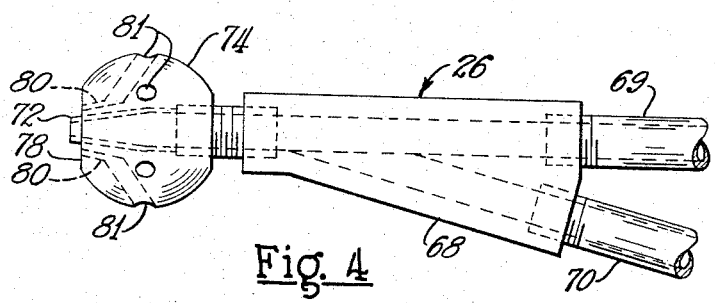
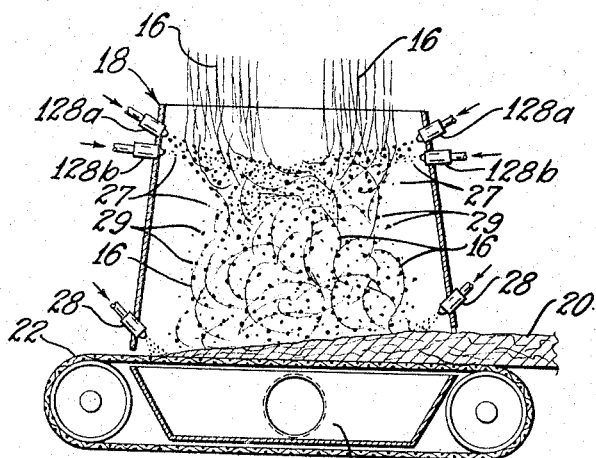
RICHARD F. SHANNON,
FLORIAN T. GORSKI &
WADE V. ZELLAR
INVENTORS
BY
*Staelin & Overman*
ATTORNEYS 3,337,669
APPARATUS AND METHODS FOR PRODUCING PANELS OF MINERAL FIBERS
Richard F. Shannon, Lancaster, and Florian T. Gorski and Wade V. Zellar, Newark, Ohio, assignors to Owens-Corning Fiberglas Corporation, a corporation of Delaware
Filed June 12, 1964, Ser. No. 374,731
10 Claims. (Cl. 264—121)

This invention relates broadly to methods and apparatus for producing bonded bodies of mineral fibers. Such products, generally of fibrous glass and in planar units with various dimensions and different degrees of rigidity are used for many purposes including wall boards, roof decking, ceiling panels, duct liners, reinforcement for molded plastics, automobile headliners, crash pads and flotation devices.

While this invention is believed of possible benefit in connection with all of these bodies of mineral fibers, it is more particularly concerned with acoustical ceiling panels of bonded fibrous glass, and for purposes of clarity the following disclosure is largely directed to the practice of the invention in connection with such products.

Bodies of fibrous glass as well as other mineral fibers are generally dimensionally stabilized and provided with more or less rigidity through the cohering action of a thermoset organic binder dispersed through the bodies and joining adjacent fibers at crossover or other points of contact or proximity.

It has long been the conventional practice and it is the preferred procedure of this invention to intermix the binder material and the fibrous glass at the fiber forming station. In a fiber forming process in general use, minute streams of molten glass issuing from a multiplicity of closely arrayed orifices in the discharge bushing of a molten glass supply reservoir are attenuated into fibers by continuous blasts of air, steam or combustion gases.

The cloud of fibers thus produced descends within a forming hood through gravity and a downward draft of air to collect upon a receiving conveyor. The binder as a liquid solution or suspension is projected in spray form into the falling cloud of fibers by atomizing nozzles.

For the creation of finer fibers, the above process may be modified by directing a transverse blast of hot gases against the descending fibers. This further attenuates the fibers while changing their course to an initially horizontal path. In this procedure the binder is applied to the further attenuated fibers by atomizing nozzles located above and below the generally horizontal path.

In a more recently developed process molten glass is fed to a rotating head which fiberizes the glass by centrifugally forcing it through orifices in the periphery of the head. From a surrounding ring of atomizing nozzles binder particles are projected against the cylindrical curtain of fibers driven downwardly by air or other gas from the rotating head to be deposited upon a collecting surface.

The pack of collected fibers, however formed and impregnated with a binder, is led through an oven where it is compressed to a selected thickness and density which are permanently established by an accompanying heat setting or curing of the binder.

The preferred binder is a phenol formaldehyde solution with an addition of an emulsion of Vinsol, a rosin derivative obtained by steam distillation from pine wood, the proportion of Vinsol being twenty percent of the solid content of the binder composition. For acoustical products an amino-modified phenol formaldehyde is preferred. Binders of urea formaldehyde, polyesters, silicones, acrylics, and epoxies also perform effectively, as do numerous other natural and synthetic resins.

The properties which make the phenol formaldehyde resin presently most acceptable for the binder composition include superior bonding strength, reasonable cost, fast curing time, low flammability, non-support of combustion, strength, durability, chemical inertness and excellent moisture resistance.

The phenol formaldehyde resinous binder retains its bonding strength and maintains the integrity of a panel of fibrous glass up to temperatures as high as 450° F. It is accordingly fully adequate for structural, acoustical, and heat insulation purposes under normal conditions and also serviceable in association with conduits or chambers in which materials are conveyed or stored at temperatures ranging up to 450° F.

Around 500° F. carbonizing of the phenol resin occurs and its bonding strength is quite entirely dissipated. Ceiling or wall panels are subject to such heat only under unusual circumstances such as a destructive fire.

If the fibrous glass stock of the panel is sufficiently compact and thick the panel may have dimensional and position holding stability for some time after the loss of the binder component. It also may be at least temporarily held in place by metal retaining grids or screening.

A wall, ceiling or partition of such shape retaining panels would act as a barrier curbing the spread of an uncontrolled conflagration until the glass is heat softened. The glass fibers then deform very rapidly and flow together to form disassociated globs. The panels thus lose their continuity and would present inconsequential opposition to any further advance of flames.

Any blocking of a fire provided by the interposition of a wall of panels naturally contributes to earlier control and reduction in losses. While a delaying action of only a few minutes may be critical, any extension in the time the panels serve as a shield materially increases their value as a fire barrier.

In order for panels to be economically feasible for wide utility as acoustical and insulating units, their cost and weight must be held to a reasonably low level. This factor generally prohibits the use of special high viscosity glass formulations which would be more difficult to fiberize, or the loading of the panels with inert inorganic material. Such loading adds weight which presents handling and supporting problems. The loading is also apt to depreciate the acoustical and insulating properties of the panels and, if the loading material is not integrated by a binder, there will be a dust problem.

Accordingly, any treatment of the fibers individually or as massed in a panel to extend the stability of the panel when exposed to conflagration must not involve an appreciable increase in costs or materials.

A system which has proved fairly acceptable comprises the incorporation in the binder solution or suspension of phenol formaldehyde or other resinous binder, of fine inorganic particles which promote early and rapid devitrification or other hardening of at least the surfaces of the glass fibers as the latter are first heat softened. For the borosilicate glass of the fibers, this softening temperature is somewhat above 1000° F. The particles may act primarily as nucleating agents or seed crystals providing starting points for devitrifying crystallization.

Particles of some supplemental substances under sublimation also may chemically combine with the glass surfaces of the fibers and thus change the composition to one that may be devitrified more readily or at a lower temperature by devitrifying particles.

The particles intended for devitrification may act at least in part under sublimation to chemically merge with the glass composition of the fibers and so alter it that the softening point is raised and so made more resistant to heat deformation without devitrification.

With at least the surface portion of the glass fibers devitrified by being converted to a crystalline phase, a rigid crystalline skeleton is formed which is much harder and viscous than the parent glass. The fibers are held in shape by their new crystalline structure until the much higher softening temperature range of this new phase is reached. The integrity and the fire barrier character of the fibrous glass panels are thus maintained for a greater length of time providing an extended opportunity for easier fire control.

The devitrifying material and other supplemental substances must be in minute particles preferably passable through a screen of 325 mesh of U.S. Sieve Series. Asbestine is a well known material considered effective for devitrification. Other nucleating or hardening agents include wollastonite, talc, silica, alumina, portland cement, and gypsum.

The devitrification is believed facilitated or accelerated by the addition of equally fine particles of titania which diffuses under heat into the glass or other mineral surfaces of the fibers and lowers the softening temperature thereof. Oxides of zirconium, chromium and iron are alternate materials capable of reducing softening points or otherwise lowering the devitrifying temperature.

Various devitrifying or hardening agents such as those referred to have been included singly or in combination, and with and without accelerating particles in the phenol formaldehyde binder suspension applied to the glass fibers in a forming hood.

Panels of such treated fibers, because of the toughening by devitrification or by hardening of the glass composition through a change therein by diffusion, resist deformation and destruction under extreme heat conditions for a considerably longer time than panels of fibers integrated with the conventional resinous binder alone. A very worthwhile improvement has thus been accomplished.

However, in producing such an improved panel it has been found necessary to materially increase the amount of the resinous binder to obtain fairly adequate stiffness in the panel, and even with the substantial increase in the amount of resinous binder there is still an undesirable lack of uniformity in the bonding of the fibers through the body of the panel.

The principal object of this invention is to provide apparatus and a method for producing fire barrier panels of mineral fibers which require a reduced amount of resinous binder and of inorganic additives to establish uniform original rigidity and prolonged shape retention under the beat of destructive flames.

In a broader sense an object of the invention is to provide apparatus and a method for applying an organic binder and inorganic modifying agents to mineral fibers in a manner in which both materials are more effective in function.

More specifically an object of the invention is the provision of apparatus and a method for applying organic binder and inorganic agents to fibers in adjacent atomized streams with a minimum of intermixing.

Another collateral object is the application of organic binder and inorganic agents simultaneously but generally upon separate portions of mineral fibers.

A general object of the invention is to provide apparatus and a method for economically producing fibrous panels of fire barrier capability.

These and other objects and advantages of the invention may be more clearly perceived through reference to the following description and the accompanying drawings.

Apparatus embodying the invention and adapted for following the practice of the method thereof is shown in the drawings, in which:

FIGURE 4 is an enlarged elevational presentation of the nozzle of FIGURE 2; and

FIGURE 5 is a vertical section of the fiber forming hood of the apparatus generally duplicating the showing of FIGURE 1 but with a different arrangement of nozzles for projecting the binder and devitrifying materials into the hood.

Figure 1:
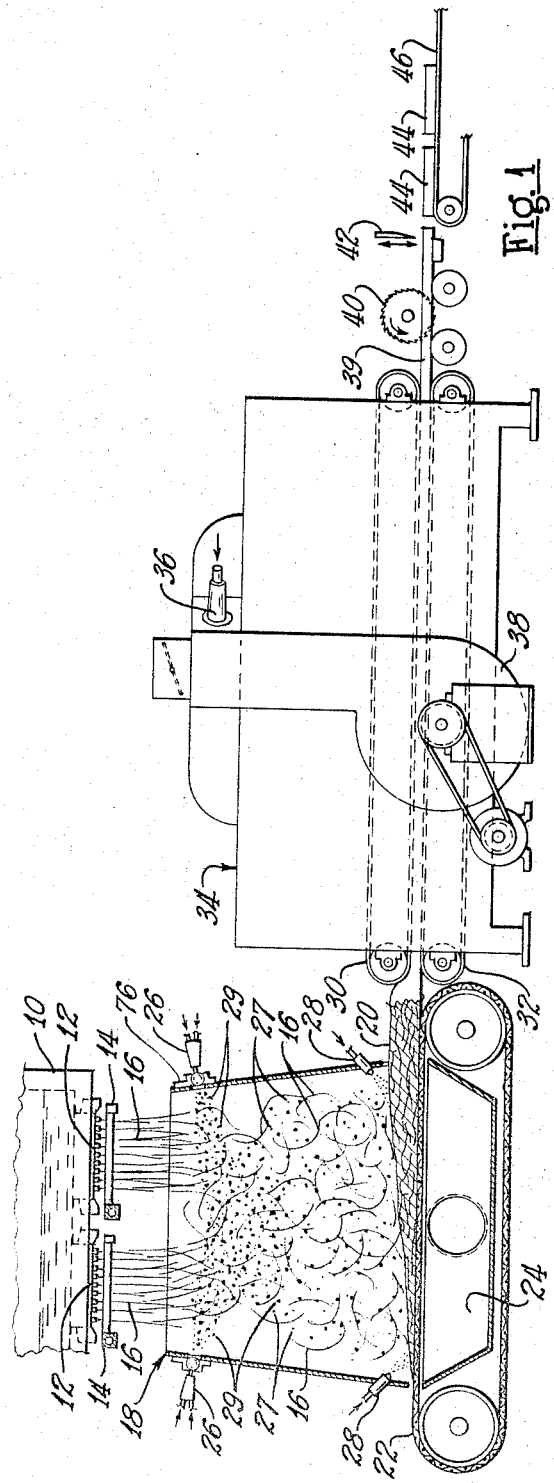
FIGURE 1 is a longitudinal elevation with portions in vertical section of a panel production line including a fiber forming hood, a pack collecting conveyor, a binder curing oven, a pack compressing conveyor arrangement in the oven, crosscutting and slicing devices and a panel finishing conveyor.

Referring to the drawings in more detail the apparatus of FIGURE 1 includes a portion of a forehearth 10 of a glass melting tank. Molten glass in fine streams is drawn from multiple ports in bushings 12 by blasts of gas or air from manifolds 14. The streams of glass are attenuated into fibers 16 which descend down through the forming hood 18 to be collected in continuous pack form upon the foraminous conveyor 22. Air movement into a suction chamber 24 beneath the conveyor aids the downward movement of the fibers and their deposit upon the conveyor 22.

The size of the orifices in the bushings 12, the viscosity of the molten glass and the force of the gaseous blasts from the manifolds are coordinated to produce fibers of a size suitable for wall boards or panels. The speed of conveyor 22 is a dominant factor determining the thickness of the panels being produced.

As the cloud of fibers 16 travels down within hood 18 particles of binder and inorganic devitrifying or toughening material are projected upon the fibers from dual nozzles 26 mounted on the sides of the hood. Lower single nozzles 28 apply additional binder to the fibers. However, dual nozzles 26 may in some cases be also stationed at the lower end of the hood to apply extra inorganic material as well as extra binder.

As a matter of identification and to indicate separate distribution (not to infer any actual difference in size) small particles 27 may be considered to be of binder composition and particles 29 of the inorganic material.

The pack 20 of impregnated fibers proceeds from the collector conveyor 22 to be compressed by the upper and lower conveyor flights 30 and 32 and carried through the binder curing oven 34. Air heated by heating means 36 is driven down through the permeable conveyor and the compressed pack by a suitable air circulating blower 38.

Beyond the exit end of the oven 34, the stabilized pack 39 with its thickness and density set by the curing of the binder is trimmed and split by rotating saw means 40 and cut transversely by knife 42, according to the width and length dimensions selected for the panels 44. The conveyor 46 takes the panels to subsequent finishing stations such as sanding, coating and packaging.

The dual nozzles 26 may be placed at various locations but are preferably mounted on the upper portions of the forward and rear walls of the forming hood 18 as shown. The number of nozzles installed is determined by the requirement to supply the desired amount of binder and inorganic agents and to distribute such material evenly through the descending cloud of fibers. Four evenly spaced nozzles mounted on both the forward and rear walls have been found effective in a production line of conventional capacity.

The location of the nozzles for most effective results will vary under different circumstances and according to the particular fiber forming process involved. They may be positioned within hoods, in wall openings or exteriorly of the hoods.

Figure 2:
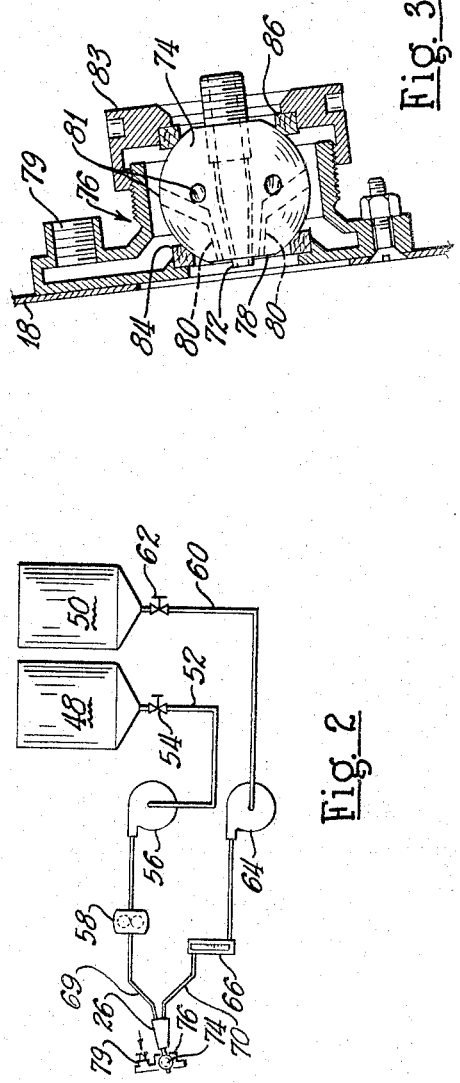
FIGURE 2 is a rather diagrammatic showing of a nozzle for discharging a binder suspension and inorganic devitrifying or toughening agents and means for delivering such materials to the nozzle.

The nozzles 26 embodying one form of this invention are arranged to receive binder and inorganic additives from different supply sources. As depicted rather diagrammatically in FIGURE 2, a binder suspension or solution is held in a container 48, the outlet of which to piping 52 is controlled by valve 54.

When the fiber forming operation is initiated valve 54 is opened and the binder carried in a liquid vehicle is drawn through piping by the pump 56. An auxiliary positive-displacement pump 58 under selected speed government serves as a metering device.

The inorganic particles in a water suspension are drawn from supply tank 50 into piping 60 on opening of the valve 62. The pump 64 handling this suspension is operated at the speed set to give a desired flow rate as indicated by the flow meter 66.

Figure 3:
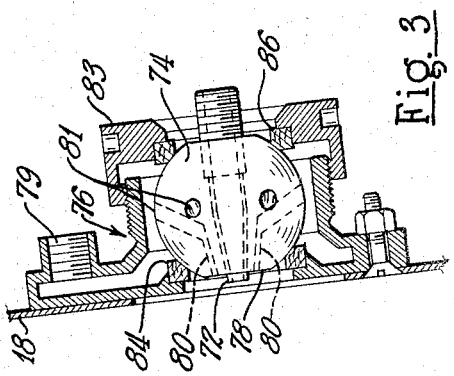
FIGURE 3 is an enlarged view of the spray head of the nozzle of FIGURE 2 and a surrounding steam cage, the latter being shown in section.

Details of the nozzle 26 may be seen in the enlarged views of FIGURES 3 and 4. The body 68 of the nozzle has two converging passageways receiving the binder components from inlet pipe 69 and the inorganic material from inlet pipe 70. These inlet pipes are respectively the terminating ends of piping 52 and 60. The two streams of binder and inorganic materials travel together through the common discharge nipple 72.

Secured to the body 68 over nipple 72 is a spherical spray head 74. This is rotatably held within the steam cage assembly 76 into which atomizing steam is admitted through inlet 79. Terminating on the flat face 78 of the spray head 74 are a series of annularly spaced steam passages 80 with inlet openings 81 in communication with the interior of the cage 76. Steam issuing from passages 80 atomizes the streams of binder and inorganic additives jointly issuing from discharge nipple 72.

The circular lines of contact between the spray head 74 and the cage 76 are sealed by gaskets 84 and 86. When it is desired to direct the spray discharge from the nozzle 26 at a different angle the nut 83 is loosened and the nozzle is tilted with the spherical spray head turning between the gaskets 84 and 86.

In the modified form of apparatus of FIGURE 5 the binder and the inorganic particles are introduced into the cloud of fibers through separate but closely positioned nozzles. As here arranged the binder solution or suspension is sprayed from the lower nozzles 128b and the inorganic suspension from upper nozzles 128a. These nozzles are similar in design to the dual nozzles 26 except in having a single supply inlet instead of the two inlets 69 and 70 of the dual nozzles.

When stiffer surface portions are required on the panel products additional binder may be placed therein by the single material nozzles 28 shown located near the bottom of the front and rear walls of hood 18 in both FIGURES 1 and 5.

In the operation of the disclosed apparatus a supply of the organic binder in a liquid vehicle is placed in the hopper-type container 48. This may be fed at a metered rate to either one or more dual nozzles 26 of the apparatus of FIGURE 1 or to a series of single nozzles 128b mounted on the forming hood of FIGURE 5.

The solids content of the binder composition for example may include resinous material of phenol formaldehyde and Vinsol pine wood extract in the proportion of four to one carried as a solute in a water vehicle. The water may constitute about eighty percent by weight of the batch.

The supply of inorganic mix with the particles in a water suspension is placed in container 50 for delivery to either dual nozzles 26 or to single nozzles 128a as shown in FIGURE 5. An agitator may be needed to maintain the fine particles in suspension and the pump 64 should be one of the commercially available designs capable of handling abrasive material.

The inorganic mix may for example be constituted by weight of 6.8 parts of asbestine, 1.7 parts of titania and 35.4 parts of water. To supplement the carrying power of the water a volatile oil commonly added to the binder batch can be included as 3 parts by weight in the inorganic mix. The function of this fugitive light oil is to provide lubricity to the fibers falling within the forming hood so that they do not unduly cling together in tight clusters or tufts.

Any carbon residue of burned organic binder interposed between particles of asbestine or of other reactive substance and the fiber surfaces interferes with the intended function of such inorganic material.

Such interposition also would retard or prevent the devitrifying acceleration derived from particles of titania or the desired effect of any other surface treating or reacting inorganic material. Such materials include those utilized to promote compatability of the fibers with a resin in which they are placed for reinforcement, those applied to increase chemical resistance of the fibers, and others for changing strength, conductivity and various other characteristics of the glass or mineral composition.

A prime purpose of this invention and the source of its success is the separate lodgment or deposit of binder particles and inorganic agents on the surface of the fibers. Each material is then unadulterated and is in direct contact with the fiber surfaces.

The attachment between the fibers secured by the spots of binder is then more tenacious and more uniform throughout the fibrous mass.

To act as nucleating seeds for devitrification of the glass the particles of asbestine should rest immediately upon the glass urface of the fibers. Should asbestine under sublimation and diffusion change the glass composition to one of a higher softening point, this development is also promoted by close association of the particles with the glass surface.

In order to accomplish the desired separate deposit of the organic binder particles and those of inorganic material, it has been found necessary to not only bring them to the zone of discharge in separate lines of supply, but also to apply them simultaneously and to continuously shield them from each other by accompanying transient liquid. The liquid serving this function in the present disclosure is primarily the water vehicle, supplemented by the minor oil component, carrying the inorganic particles, and secondarily the water vehicle of the binder.

The simultaneous application of the binder and inorganic materials is assured with the use of duel nozzles 26. In spite of the common discharge nipple 72 and the prior merging of the two streams of different materials, surprisingly no substantial mixture occurs. The rapidity of flow, the short space between the joinder and discharge of the streams, and the water vehicles are evidently responsible for this phenomenon.

The binder composition in atomized form indicated at 27 remains apparently distinct from the spray particles 29 of the suspension of inorganic material and the two different agents are deposited in generally spaced relationship upon the fibers.

It may be noted that there is not only simultaneous discharge, but also simultaneous deposit, a common discharge point, and close but not generally identical points of deposit upon the fibers. Due to the full effectiveness of the functions of the materials thus obtained only a minimum amount of both binder and inorganics need be employed. A marked superiority and uniformity in performance of both materials is also a most important benefit.

In the embodiment of FIGURE 5 spray nozzles 128a discharge the inorganic suspension and nozzles 128b separately discharge the atomized binder solution. The feed to the two sets of nozzles is carefully synchronized and they are closely arrayed for the simultaneous discharge, simultaneous deposit, a common compact zone of discharge and closely positioned but generally separate points of deposit upon the fibers.

In addition to glass fibers, this invention may be advantageously followed with any other fibers which are to be held by an organic binder in a shaped mass and upon which particles of an inorganic material are to be separately placed. Being somewhat comparable to glass in composition, fibers of asbestos, rock wool and mineral wool may respond similarly to some of the specific inorganic materials identified herein and therefore be more fully adapted to the practice of this invention.

While the inorganic materials identified herein generally function to modify the composition, surface or physical characteristics of the mineral fibers, they may serve in part as simple bodying agents. In this case it is still desirable to deposit particles thereof separately to maintain the effectiveness of the binder.

Many modifications and substitutions in the embodiments of the invention disclosed herein will occur to those skilled in the arts involved without departing from the spirit of the invention or the confines of the accompanying claims.

We claim:

1. A method of separately placing particles of an organic binder and of an inorganic material upon the surfaces of fibers to be compacted into panels which comprises directing a cloud of fibers in a path toward a receiving area, carrying the organic binder and inorganic material in two separate substantial streams of volatile liquid vehicles, and simultaneously projecting the two streams in atomized form into the cloud of fibers, the liquid vehicles of the organic binder and inorganic material maintaining the particles thereof in generally spaced relation for separate deposite upon different portions of the surfaces of the fibers.

2. A method according to claim 1 in which the inorganic material is actuatable by heat to harden the glass of the fibers.

3. A method according to claim 2 in which the inorganic material hardens the glass by devitrification.

4. A method according to claim 1 in which the organic binder has a formaldehyde reactive base and the inorganic material includes asbestine.

5. A method according to claim 1 in which the organic binder is a synthetic resin and the inorganic material includes titania.

6. In producing panels of mineral fibers a method of separately placing particles of a binder and of a second material of different function in direct contact upon the surfaces of mineral fibers to be compacted into panel form which comprises directing a cloud of mineral fibers in a path toward a receiving area, carrying the binder and the second material in two separate streams with water as a liquid vehicle, and simultaneously projecting the two streams in atomized form into the cloud of fibers, the water vehicles of the binder and the second material maintaining the particles thereof in generally spaced relation for separate and spaced deposit and functioning upon the surfaces of the fibers.

7. A method of producing a fire resisting panel of mineral fibers which comprises directing a cloud of mineral fibers toward a receiving surface, simultaneously projecting into the cloud of fibers two adjacent atomized streams respectively of an organic settable binder in a volatile liquid vehicle and of inorganic particles in a volatile liquid vehicle, said inorganic particles beng actuatable under heat to harden the composition of the mineral fibers, said liquid vehicles maintaining the organic binder and the inorganic particles in spaced relation for generally separate and spaced deposit upon the surface of the fibers, collecting the fibers in pack form, compressing the pack to a thickness suitable for a panel, and setting the binder to stabilize the thickness of the pack.

8. A method of producing a fire resisting panel of glass fibers which comprises directing a cloud of glass fibers toward a receiving surface, simultaneously and adjacently projecting into the cloud of fibers an atomized stream of an organic heat settable binder in a water vehicle and an atomized stream of inorganic particles in a water vehicle, said inorganic particles being actuatable under heat to coact with and harden the composition of the glass fibers, said water vehicles maintaining the organic binder and the inorganic particles in spaced relation for generally separate and spaced deposit upon the surface of the glass fibers, collecting the fibers in pack form, compressing the pack to a thickness suitable for a panel, and setting the binder by heat to stabilize the thickness of the pack.

9. Apparatus for producing a panel of mineral fibers with a binder holding the fibers at spaced points and with particles of inorganic material on surface portions of the fibers uncoated by the binder said apparatus including fiber supplying means, a fiber receiving surface below the supplying means, a chamber providing a downward path for fibers between the supplying means and the receiving surface, a nozzle adjacent said path, conduit delivering separate streams of binder and inorganic material to the nozzle, a spray outlet on the nozzle for discharging closely arrayed atomized streams of binder and inorganic material, a ball shaped member around the end of the nozzle, a mounting for the nozzle fixed over an opening in a wall of the chamber, a spaced pair of annular socket providing sealing rings in the mounting fitting against the forward and rearward ends of the ball shaped member whereby the nozzle may be swiveled with the ball shaped member, the structure of the mounting providing a chamber around the ball shaped member, and an air supply inlet communicating with said chamber, there being passages in the ball shaped member for receipt of air from the chamber and discharge of the air in atomizing relation to streams of binder and inorganic material emitted from the nozzle.

10. In apparatus for producing a panel of mineral fibers with a binder holding the fibers at spaced points within the panel, fiber supplying means, a fiber receiving surface below the supplying means, a chamber providing a downward path for fibers between the supplying means and the receiving surface, a nozzle adjacent said path, a conduit delivering binder in a liquid vehicle to the nozzle, a spray outlet on the nozzle for discharging the binder in the liquid vehicle in atomized form into the path of the fibers, a ball shaped member around the end of the nozzle, a mounting for the nozzle fixed over an opening in a wall of the chamber, a spaced pair of annular sockets providing sealing rings in the mounting fitting against the forward and rearward ends of the ball shaped member whereby the nozzle may be swiveled with the ball shaped member, the structure of the mounting providing a chamber around the ball shaped member, and an air supply inlet communicating with said chamber, there being passages in the ball shaped member for receipt of air from the chamber and discharge of the air in atomizing relation with the binder in the liquid vehicle as it is emitted from the nozzle.

References Cited
UNITED STATES PATENTS 2,995,173  8/1961  Nawalanic.
3,220,915  11/1965  Shannon.

ROBERT F. WHITE, *Primary Examiner.*

J. R. HALL, *Assistant Examiner.*